(12) United States Patent
Choi et al.

(10) Patent No.: US 9,009,532 B2
(45) Date of Patent: Apr. 14, 2015

(54) COMMUNICATION TEST APPARATUS AND METHOD

(75) Inventors: Byoung Ju Choi, Seoul (KR); Joo Young Seo, Seoul (KR); Sueng Wan Yang, Gyeonggi-do (KR); Young Su Kim, Gyeonggi-do (KR); Jung Suk Oh, Gyeonggi-do (KR); Hae Young Kwon, Gyeonggi-do (KR); Seung Yeun Jang, Gyeonggi-do (KR)

(73) Assignees: Hyundai Motor Company, Seoul (KR); Kia Motors Corporation, Seoul (KR); Ehwa University-Industry Collaboration Foundation, Seoul (KR)

( * ) Notice: Subject to any disclaimer, the term of this patent is extended or adjusted under 35 U.S.C. 154(b) by 180 days.

(21) Appl. No.: 13/703,760

(22) PCT Filed: Mar. 15, 2011

(86) PCT No.: PCT/KR2011/001805
§ 371 (c)(1),
(2), (4) Date: Dec. 12, 2012

(87) PCT Pub. No.: WO2012/124841
PCT Pub. Date: Sep. 20, 2012

(65) Prior Publication Data
US 2013/0091390 A1    Apr. 11, 2013

(51) Int. Cl.
*G06F 11/00*    (2006.01)
*G06F 11/36*    (2006.01)

(52) U.S. Cl.
CPC .......... *G06F 11/006* (2013.01); *G06F 11/3672* (2013.01); *G06F 11/3636* (2013.01)

(58) Field of Classification Search
CPC ............ G06F 11/3089; G06F 11/3096; G06F 11/3013; G06F 11/3644; G06F 11/3636; G06F 11/3672

USPC .............................................. 714/32, 35, 38.1
See application file for complete search history.

(56) References Cited

U.S. PATENT DOCUMENTS 5,454,086 A * 9/1995 Alpert et al. ................... 712/227
8,429,617 B2 * 4/2013 Demetriou et al. ........... 717/124
(Continued)

FOREIGN PATENT DOCUMENTS

EP    2587379 A1    5/2013
EP    2615552 A1    7/2013
(Continued)

OTHER PUBLICATIONS

Anonymous, "strace (1)—Linux manual page" (Mar. 30, 2010) pp. 1-10.
(Continued)

*Primary Examiner* — Marc Duncan
(74) *Attorney, Agent, or Firm* — Mintz Levin Cohn Ferris Glovsky and Popeo, P.C.; Peter F. Corless

(57) ABSTRACT

The present invention relates to a communication test apparatus. The communication test apparatus includes an insertion module configured to insert a test agent into the process control block, a hooking module configured to hook a test target to a test code using the test agent when an event-related to communication occurs between the plurality of processes, a scanning module configured to collect pieces of test information about communication between the plurality of processes when the test target is hooked to the test code, and a logging module configured to store the pieces of test information collected by the scanning module.

20 Claims, 3 Drawing Sheets

(56) References Cited

U.S. PATENT DOCUMENTS

| | | | |
|---|---|---|---|
| 8,904,361 B2* | 12/2014 | Vertes | 717/130 |
| 2003/0023956 A1* | 1/2003 | Dulberg et al. | 717/130 |
| 2007/0234295 A1* | 10/2007 | Dufour et al. | 717/124 |
| 2008/0209443 A1 | 8/2008 | Suzuki | |
| 2008/0307265 A1* | 12/2008 | Vertes | 714/38 |
| 2009/0089622 A1 | 4/2009 | Qi et al. | |
| 2009/0249368 A1* | 10/2009 | Needamangala et al. | 719/328 |
| 2010/0299655 A1* | 11/2010 | Heisch et al. | 717/130 |
| 2012/0159454 A1* | 6/2012 | Barham et al. | 717/128 |
| 2013/0086425 A1* | 4/2013 | Choi et al. | 714/32 |
| 2013/0096880 A1* | 4/2013 | Choi et al. | 702/182 |

FOREIGN PATENT DOCUMENTS

| | | |
|---|---|---|
| JP | 2009237610 A | 10/2009 |
| JP | 2010157875 A | 7/2010 |
| KR | 10-2007-0087400 | 8/2007 |
| WO | 2007-039486 A2 | 4/2007 |

OTHER PUBLICATIONS

Seo, J. et al. "A profiling method by PCB hooking and its application for memory fault detection in embedded system operational test" Information and Software Technololgy, 53 (2001) pp. 106-119.

* cited by examiner

COMMUNICATION TEST APPARATUS AND METHOD

CROSS-REFERENCE TO RELATED APPLICATIONS

This application is a 35 U.S.C. §371 U.S. national entry of International Application PCT/KR2011/001805 (WO 2012/124841) having an International filing date of Mar. 15, 2011, which is incorporated by reference in its entirety.

TECHNICAL FIELD

The present invention relates to a communication test apparatus and method, and more particularly, to a communication test apparatus for collecting pieces of test information in order to determine whether communication between a plurality of processes is performed without error or not.

BACKGROUND ART

In an embedded system including various pieces of software and hardware, interaction is important in an environment in which systems operate. Accordingly, not virtual data for a test including only software, but an operation using real data obtained in a live environment in which a system operates really is important. If it is sought to test a system, there is a need for a scheme capable of effectively detecting a potential defect or an operational defect occurring when the system operates really by performing a test for the system using real operation data.

Furthermore, in order to independently test pieces of software that form a system, a lot of test resources and costs are necessary because additional equipment for replacing a counterpart component must be used. Accordingly, there is a need for a test apparatus, which can test all processes included in a system in real time and minimize memory space overhead or performance overhead due to the execution of a corresponding code.

DISCLOSURE

Technical Problem

An embodiment of the present invention is directed to providing a communication test apparatus and method which are capable of testing an actually operating system, performing a dynamic test even in the run-time conditions of a system, and checking a defect occurring while all processes included in a system perform communication, by performing a test for communication between processes included in a system using hooking technology.

Technical Solution

In an aspect, the present invention relates to a communication test apparatus. The communication test apparatus includes an insertion module configured to insert a test agent into a process control block, a hooking module configured to hook a test target to a test code using the test agent when an event-related to communication occurs between a plurality of processes, a scanning module configured to collect pieces of test information about communication between the plurality of processes when the test target is hooked to the test code, and a logging module configured to store the pieces of test information collected by the scanning module.

In another aspect, the present invention relates to a communication test apparatus. The communication test method includes inserting a test agent into a process control block, hooking a test target to a test code using the test agent when an event-related to communication occurs between a plurality of processes, collecting pieces of test information about communication between the plurality of processes when the test target is hooked to the test code, and storing the pieces of collected test information.

In yet another aspect, the present invention relates to a communication test the system. The communication test system includes an input apparatus configured to receive a signal for driving a system, a communication test apparatus configured to insert a test agent into a process control block, hook a test target to a test code using the test agent, and collect pieces of test information about communication between a plurality of processes, while the system operates in response to the signal received through the input apparatus, and an analysis apparatus configured to analyze the pieces of test information collected by the communication test apparatus.

Advantageous Effects

In accordance with the present invention, a communication test for a system can be performed while the system operates actually because not a source code, but an actually operated code is used as a target.

Furthermore, system overhead can be minimized and a test for a system can be performed without interrupting the system because a hooking method of utilizing information included in a process control block is used without inserting an individual code into each process.

Furthermore, although shared resources between processes are limited, pieces of information about a test can be collected in real time and a result of the test can be checked based on the pieces of information.

MODE FOR INVENTION

The present invention relates to a test in an environment in which a system operates actually and to an apparatus and method which can test a system in a dynamic situation from the start of the system to the end of the system. The present invention can perform a test for all processes which operate within a system using a hooking scheme. More particularly, a test for communication between all processes operating in a system can be performed FIG. 1 is a diagram showing the entire system in which a communication test apparatus according to an embodiment of the present invention is used.

Figure 1:
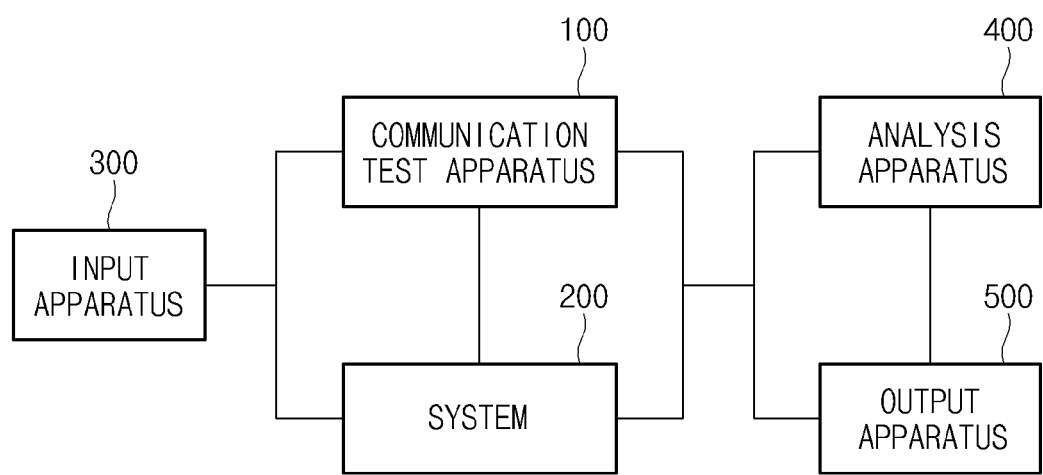
FIG. 1 is a diagram showing the entire system in which a communication test apparatus according to an embodiment of the present invention is used.

As shown in FIG. 1, the entire system includes a communication test apparatus 100, a system 200, an input apparatus 300, an analysis apparatus 400, and an output apparatus 500.

The communication test apparatus 100 is configured to test communication between two or more processes included in the system 200. The communication test apparatus 100 may collect pieces of test information about the sharing of resources between all the processes included in the system 200 and about whether communication is precisely performed. The communication test apparatus 100 may be provided independently from the system 200, as shown in FIG. 1, or may be implemented in a form that the communication test apparatus 100 is included in the system 200.

The system 200 is a test target of the communication test apparatus 100. The system 200 is an embedded system in which various pieces of software and hardware are integrated. The system, that is, a test target of the communication test apparatus 100, refers to one or more systems including a plurality of processes. Accordingly, not only communication between a plurality of processes included in one system, but also communication between processes included in different systems may become a test target of the communication test apparatus 100.

The system 200 may include all embedded systems and computer systems in which multiple processes perform communication one another and may become, for example, an infotainment system, a multimedia system, or a wired/wireless network system. For example, if the system 200 is a vehicle infotainment system, the system 200 may include Terrestrial Digital Multimedia Broadcasting (TDMB), Transport Protocol Expert Group (TPEG), IPOD, USB, Bluetooth, Voice Recognition (VR), a Parking Guidance System (PGS), a Radio Data System (RDS), Vehicle CDC (VCDC), a Driver Information System (DIS), Rear Seat Entertainment (RSE), a Hybrid Electric Vehicle (HEV) display, and an Air Handling Unit (AUH) display on the basis of an Audio Video Navigation (AVN) function.

The input apparatus 300 is a user input apparatus for driving the communication test apparatus 100 and the system 200. The input apparatus 300 may be implemented using a keyboard or a touch screen. The system 200 is driven in response to a signal received through the input apparatus 300. Furthermore, the communication test apparatus 100 executes an operation for a communication test in response to a signal received through the input apparatus 300.

The analysis apparatus 400 analyzes pieces of test information collected by the communication test apparatus 100 and checks an error, occurred in communication between a plurality of processes included in the system 200, based on a result of the analysis. The communication test apparatus 100, together with the analysis apparatus 400, may be integrated into one apparatus. In this case, the communication test apparatus 100 may check a result of a test by collecting pieces of test information and, at the same time, analyzing the pieces of collected test information.

The output apparatus 500 outputs the pieces of test information collected by the communication test apparatus 100 or a result of the test analyzed by the analysis apparatus 400 in the form of an image or voice. A user may check a result of a communication test through the output apparatus 500.

Figure 2:
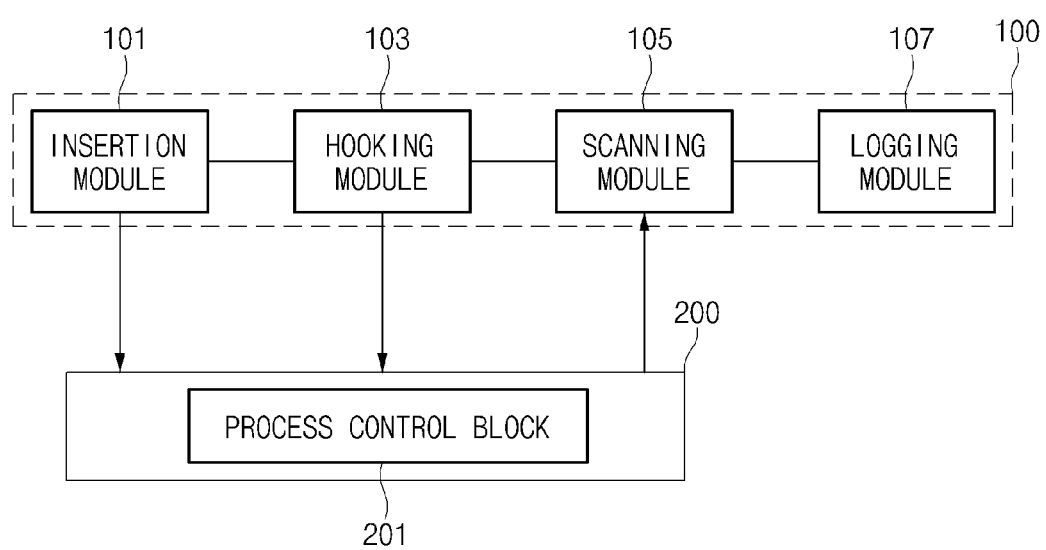
FIG. 2 shows the construction of the communication test apparatus according to the embodiment of the present invention.

FIG. 2 shows the construction of the communication test apparatus 100 according to the embodiment of the present invention.

As shown in FIG. 2, the communication test apparatus 100 includes an insertion module 101, a hooking module 103, a scanning module 105, and a logging module 107. In FIG. 2, it is assumed that the system 200, that is, a test target, connected to the communication test apparatus 100 is a single system including two or more processes.

The system 200 includes a process control block 201. The process control block 201 includes run-time execution information about all processes included in the system 200. The run-time execution information means execution information between all the processes while the system 200 operates. Accordingly, the process control block 201 may include the present state of resource use, a process state, order of priority, and a function table for all the processes included in the system 200. More particularly, the process control block 201 may include a process ID, a process name, a current process, a current thread, a list of processes being executed in the system 200, a list of modules, a system page size, an available physical memory size, CPU usage, a list of resources being used, an I/O apparatus state being requested, information about an opened file, and information about registers. Accordingly, a data structure or apparatus including the above-described information in all systems corresponds to the process control block 201 of the present invention.

The insertion module 101 inserts a test agent into the process control block 201. The test agent may hook a test code based on information included in the process control block 201 and collect pieces of test information. A test position to which the test code is hooked may be defined depending on the type of detect. In the present invention, the system 200 operates normally before the test agent is inserted into the process control block 201. The system 200 operates normally without being influenced by the operation of the communication test apparatus 100.

Furthermore, the insertion module 101 may check a list of processes that are operating in the system 200, select two or more processes from a list of the processes as a test target, and insert a test agent for testing communication between the selected processes into the process control block 201.

The hooking module 103 hooks the test target to a test code using the test agent inserted by the insertion module 101. In the present invention, the test code to which the test target is hooked may be a code that generates an event-related to communication, from among codes included in a process. The test code is changed depending on the type of detect to be tested. Furthermore, the hooking module 103 may change a test position to which the test code is hooked.

The term 'being hooked to the test code' means that when an event related to communication between a plurality of processes occurs within the system 200 operating now, the inserted test agent hooks the process control block of an OS so that the test code including the operation of an original code is executed. The hooking module 103 may check that what type of an event related to communication occurs between what processes based on information included in the process control block 201. Here, the event-related to communication means message passing, the transfer of shared data, the use of shared memory, the use of a message queue, and the use of a synchronization object between the plurality of processes.

The test code is a code for checking the type of detect which is related to message passing, a message queue, shared memory, or a synchronization object between plurality of processes.

For example, the test code may include a first function, such as SendMessage( ) or PostMessage( ) and a second function that is necessary depending on the type of defect to be tested. The processes included in the system 200 include the first functions, respectively. Accordingly, when an event related to communication occurs between the first process and the second process, the hooking module 103 hooks a test target to a test code in such a manner that an inserted test agent executes the test code instead of the first functions of the first process and the second process in a step in which the first functions are executed in the first process and the second process. The step in which the first functions are executed in the first process and the second process is checked based on information included in the process control block 201.

Meanwhile, since the test target is communication between the plurality of processes, the test code may be hooked in only one of a transmitter and a receiver depending on the type of detect to be tested.

The scanning module 105 collects pieces of test information about communication between a plurality of processes in which an event-related to communication has occurred when a test target is hooked to a test code. Here, the event related to communication between the plurality of processes includes not only an event related to an already generated event, but also an event related to communication occurring according to the hooking of the test code. The pieces of collected test information are different depending on a test step, a test object, and the type of detect to be tested.

Accordingly, the scanning module 105 collects pieces of information about the dynamic state of the system that are necessary to determine a defect for the communication between the plurality of processes, such as a function parameter and return value, a performance measurement value, and a shared resource use list.

The pieces of test information may include call-stack information about the plurality of processes, the type of communication, communication IDs, and communication data transmitted and received between the plurality of processes, and a delay time occurred in the communication between the plurality of processes.

The logging module 107 stores the pieces of test information, collected by the scanning module 105, in a storage space. The storage space may be included in the logging module 107 or may be implemented as a device different from the logging module 107. The analysis apparatus 400 of FIG. 1 may analyze the pieces of test information collected by the scanning module 105 or the pieces of test information stored in the logging module 107.

Figure 3:
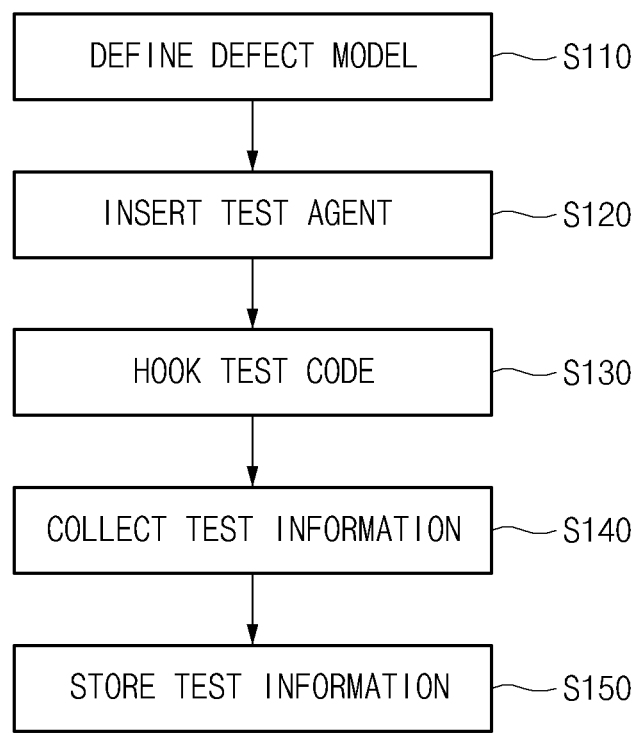
FIG. 3 is a flowchart illustrating a communication test method according to an embodiment of the present invention.

FIG. 3 is a flowchart illustrating a communication test method according to an embodiment of the present invention.

FIG. 3 shows a communication test method for performing a test for communication between a plurality of processes. First, the defect model is defined at step S110. Here, the defect model means a position where communication between processes to be tested depending on the type of detect is performed and test information necessary to discover and recover the defect. While the system 200 operates normally, a test code capable of collecting pieces of test information may be generated according to the defined defect model.

Next, a test agent is inserted into the process control block 201 of the system 200, that is, a test target at step S120. The system 200 operates normally before the test agent is inserted into the process control block 201.

When an event-related to communication occurs between a plurality of processes, the inserted test agent hooks the test target to the test code at step S130. When the test target is hooked to the test code, the test code may be executed instead of a process in which the event-related to communication has occurred.

When the test target is hooked to the test code, pieces of test information about communication between the plurality of processes in which the event-related to communication has occurred are collected at step S140. The pieces of collected test information are stored at step S150. Here, the pieces of test information may be collected only while the test target is hooked to the test code, or the pieces of test information may be collected while the test target is hooked to the test code and while the system operates after the test target is hooked to the test code.

The test code according to is used to check the type of detect which is related to message passing, a message queue, shared memory, or a synchronization object between a plurality of processes.

The type of detect related to the message passing may be classified into a message passing failure (synchronization), a message deadlock (synchronization), message processing delay (synchronization), a message loss (synchronization), a message change (synchronization), a failure in insertion into a message queue (asynchronization), message processing delay (asynchronization), a message loss (asynchronization), and a message change (asynchronization) within a predetermined time.

The type of detect related to the message queue may be classified into a message queue generation failure, a message queue close failure, a failure of read from a message queue, and a failure of write in a message queue.

The type of detect related to the shared memory may be a shared memory generation failure.

The type of detect related to the synchronization object may be classified into the use of a synchronization object not generated, the non-use of a generated synchronization object, and the non-release of a used synchronization object.

Accordingly, the test code is changed depending on the type of detect.

As described above, the communication test apparatus 100 according to the present invention can insert a test agent, hook a test target to a test code, and collect pieces of test information without affecting the system 200 that is operating. The communication test apparatus 100 performs a communication test based on information included in the process control block 201 of the system 200.

The present invention may be implemented in a recording medium in the form of a code readable by a processor. The recording medium readable by a processor includes all types of recording devices in which data readable by a processor is stored. The recording medium may include, for example, ROM, RAM, CD-ROM, magnetic tapes, floppy disks, and optical data storages. Furthermore, the recording medium readable by a processor may be distributed over computer systems connected over a network, and the code readable by a processor may be stored and executed in a distributed manner.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Industrial Applicability

The present invention can perform a communication test for a system while the system operates actually.

The invention claimed is:

1. A communication test apparatus for a system comprising a plurality of processes and a process control block including run-time execution information about the plurality of processes in order to determine whether or not communication between a plurality of processes is performed without error, the communication test apparatus comprising:
   an insertion module configured to insert a communication test agent into the process control block;
   a hooking module configured to hook a test target to a test code in such a manner that the communication test agent executes the test code instead of functions of the plurality of processes when an event related to communication occurs between the plurality of processes;

a scanning module configured to collect pieces of test information about communication between the plurality of processes for the purpose of determining a defect in the communication between the plurality of processes, when the test target is hooked to the test code;

a logging module configured to store the pieces of test information collected by the scanning module; and an analysis apparatus configured to analyze the pieces of collected test information to determine a defect in the communication between the plurality of processes.

2. The communication test apparatus of claim 1, wherein the process control block comprises at least one of a present state of resource use, a process state, order of priority, and a function table for the plurality of processes.

3. The communication test apparatus of claim 1, wherein the event related to communication comprises at least one of message passing, a transfer of shared data, a use of shared memory, a use of a message queue, and a use of a synchronization object between the plurality of processes.

4. The communication test apparatus of claim 1, wherein the test code is a code for checking the type of defect regarding at least one of the message passing, the message queue, the shared memory, and the synchronization object between the plurality of processes.

5. The communication test apparatus of claim 1, wherein the pieces of test information comprise at least one of call-stack information about the plurality of processes, a type of communication, communication IDs, and communication data transmitted and received between the plurality of processes, and a delay time occurred in communication between the plurality of processes.

6. The communication test apparatus of claim 1, wherein the pieces of test information comprise pieces of information about a dynamic state of the system, information about a process state, and information about communication between the plurality of processes.

7. The communication test apparatus of claim 1, wherein the test code is defined depending on a type of defect.

8. The communication test apparatus of claim 1, wherein the system is an embedded system or computer system in which the plurality of processes communicate with one another.

9. A communication test method for a system comprising a plurality of processes and a process control block including run-time execution information about the plurality of processes in order to determine whether or not communication between a plurality of processes is performed without error, the communication test method comprising:

inserting a communication test agent into the process control block;

hooking a test target to a test code in such a manner that the communication test agent executes the test code instead of functions of the plurality of processes when an event related to communication occurs between the plurality of processes;

collecting pieces of test information about communication between the plurality of processes for the purpose of determining a defect in the communication between the plurality of processes when the test target is hooked to the test code;

storing the pieces of collected test information; and analyzing the pieces of collected test information to determine a defect in the communication between the plurality of processes.

10. The communication test method of claim 9, wherein the process control block comprises at least one of a present state of resource use, a process state, order of priority, and a function table for the plurality of processes.

11. The communication test method of claim 9, wherein the event related to communication comprises at least one of message passing, a transfer of shared data, a use of shared memory, a use of a message queue, and a use of a synchronization object between the plurality of processes.

12. The communication test method of claim 9, wherein the test code is a code for checking the type of defect regarding at least one of the message passing, the message queue, the shared memory, and the synchronization object between the plurality of processes.

13. The communication test method of claim 9, wherein the pieces of test information comprise at least one of call-stack information about the plurality of processes, a type of communication, communication IDs, and communication data transmitted and received between the plurality of processes, and a delay time occurred in communication between the plurality of processes.

14. The communication test method of claim 9, wherein the system is an embedded system or computer system in which the plurality of processes communicates with one another.

15. A communication test system for a system comprising a plurality of processes and a process control block including run-time execution information about the plurality of processes in order to determine whether or not communication between a plurality of processes is performed without error, the communication test system comprising:

an input apparatus configured to receive a signal for driving the system;

a communication test apparatus configured to insert a communication test agent into the process control block, hook a test target to a test code in such a manner that the test agent executes the test code instead of functions of the plurality of processes when an event related to communication occurs between the plurality of processes, and collect pieces of test information about communication between the plurality of processes for the purpose of determining a defect in the communication between the plurality of processes, while the system operates in response to the signal received through the input apparatus; and an analysis apparatus configured to analyze the pieces of test information collected by the communication test apparatus to determine a defect in the communication between the plurality of processes.

16. The communication test system of claim 15, wherein the communication test apparatus comprises a logging module for storing the pieces of collected test information.

17. The communication test system of claim 15, wherein the process control block comprises at least one of a present state of resource use, a process state, order of priority, and a function table for the plurality of processes.

18. The communication test system of claim 15, wherein a test position where the test code is hooked is changeable depending on a type of defect.

19. The communication test system of claim 15, wherein the pieces of test information comprise at least one of call-stack information about the plurality of processes, a type of communication, communication IDs, and communication data transmitted and received between the plurality of processes, and a delay time occurred in communication between the plurality of processes.

20. The communication test system of claim 15, further comprising an output apparatus configured to output a result of the test, analyzed by the analysis apparatus, in an image or voice form.

\* \* \* \* \*